April 28, 1936.  M. MADSEN ET AL  2,038,746
ELECTRICALLY CONTROLLED AUTOMATIC WEIGHING DEVICE FOR PAVING PLANTS
Filed Aug. 24, 1931  7 Sheets-Sheet 3
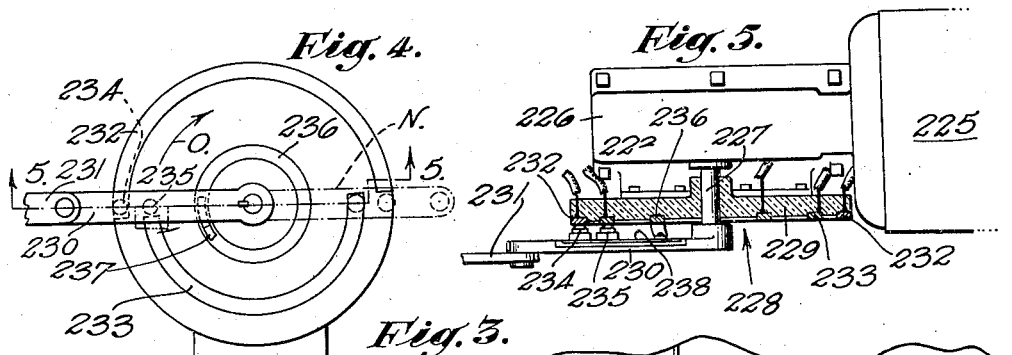
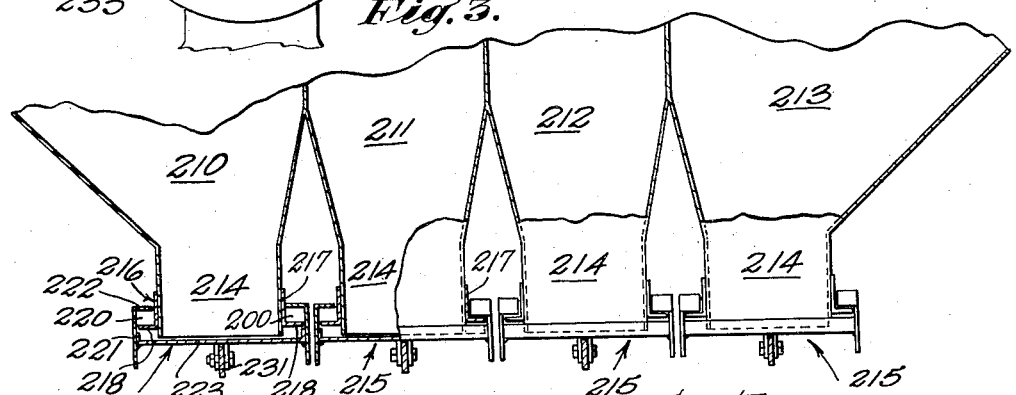
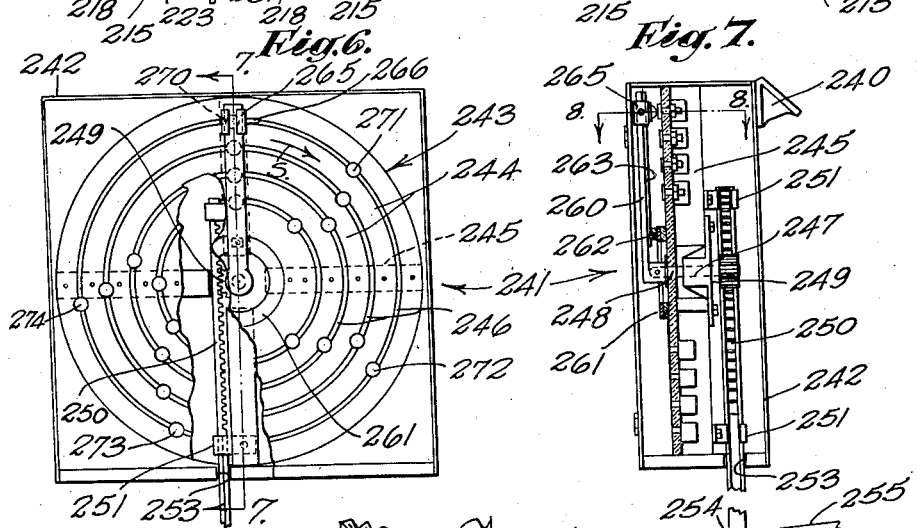
INVENTORS:
MARTIN MADSEN,
ALBERT H. ZIEGLER,
HARRY B. PARROT,
HAROLD M. RUTH,
BY
ATTORNEY April 28, 1936.　　　M. MADSEN ET AL　　　2,038,746
ELECTRICALLY CONTROLLED AUTOMATIC WEIGHING DEVICE FOR PAVING PLANTS
Filed Aug. 24, 1931　　　7 Sheets-Sheet 4
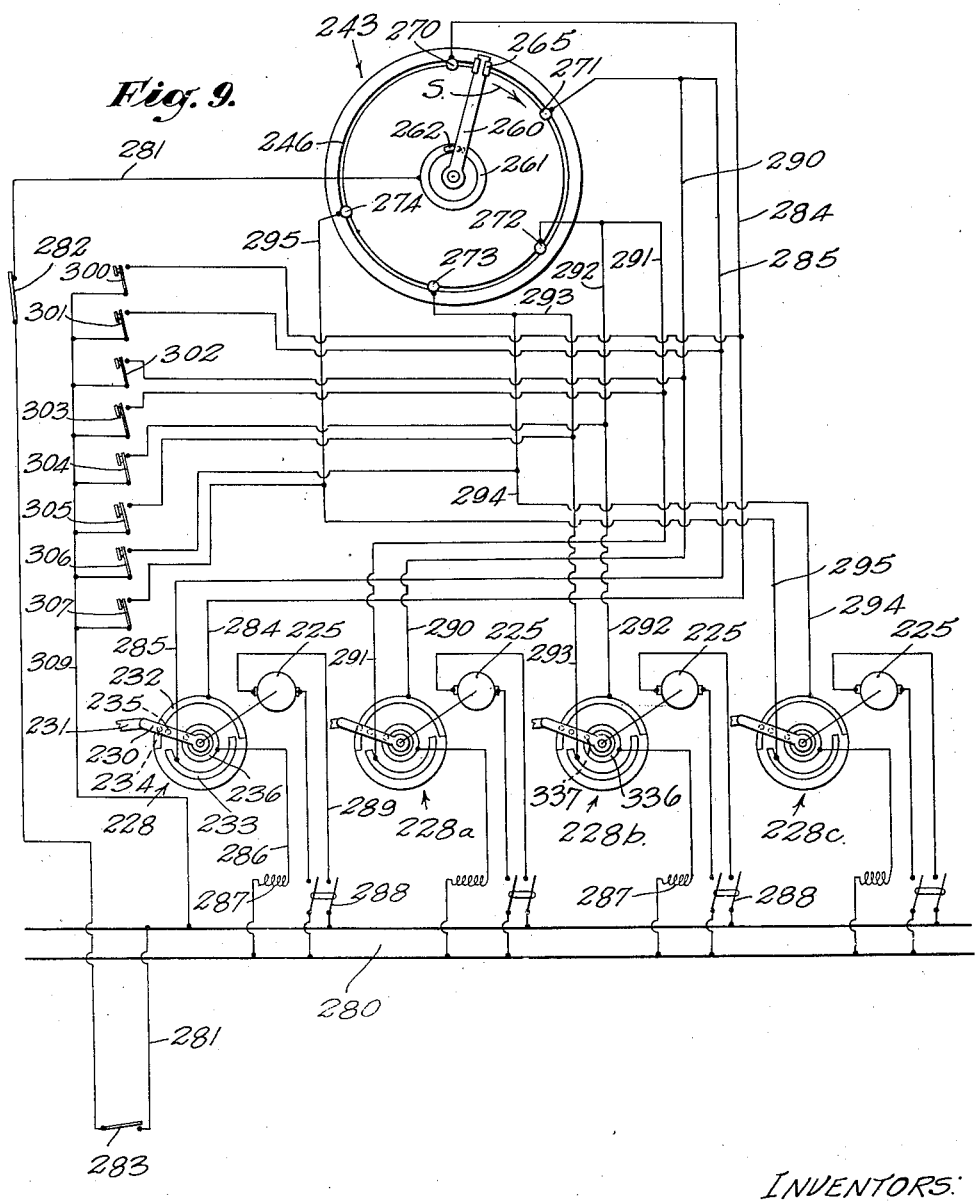
INVENTORS:
MARTIN MADSEN,
ALBERT H. ZIEGLER,
HARRY B. PARROT,
HAROLD M. RUTH,
BY
ATTORNEY.

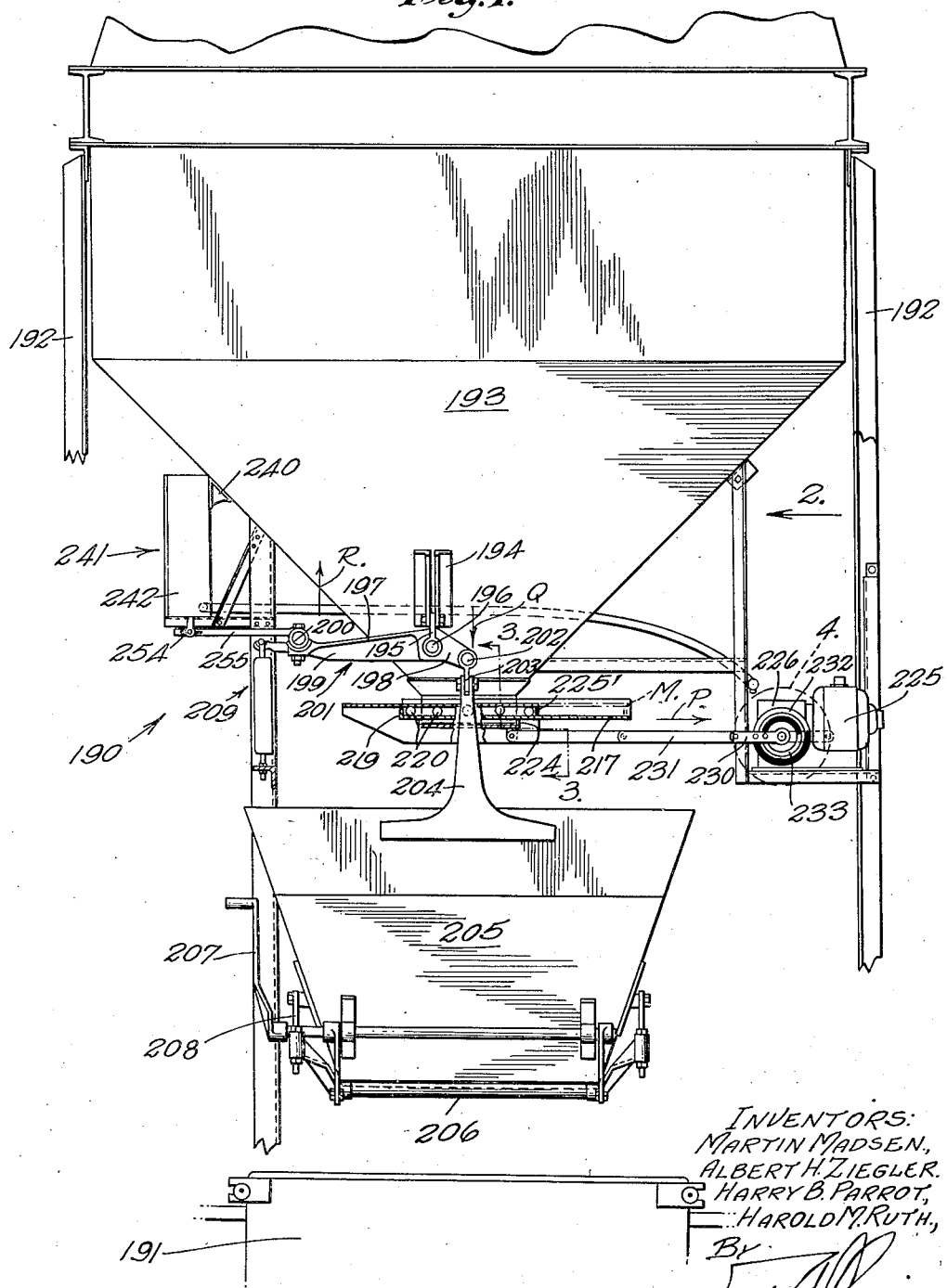

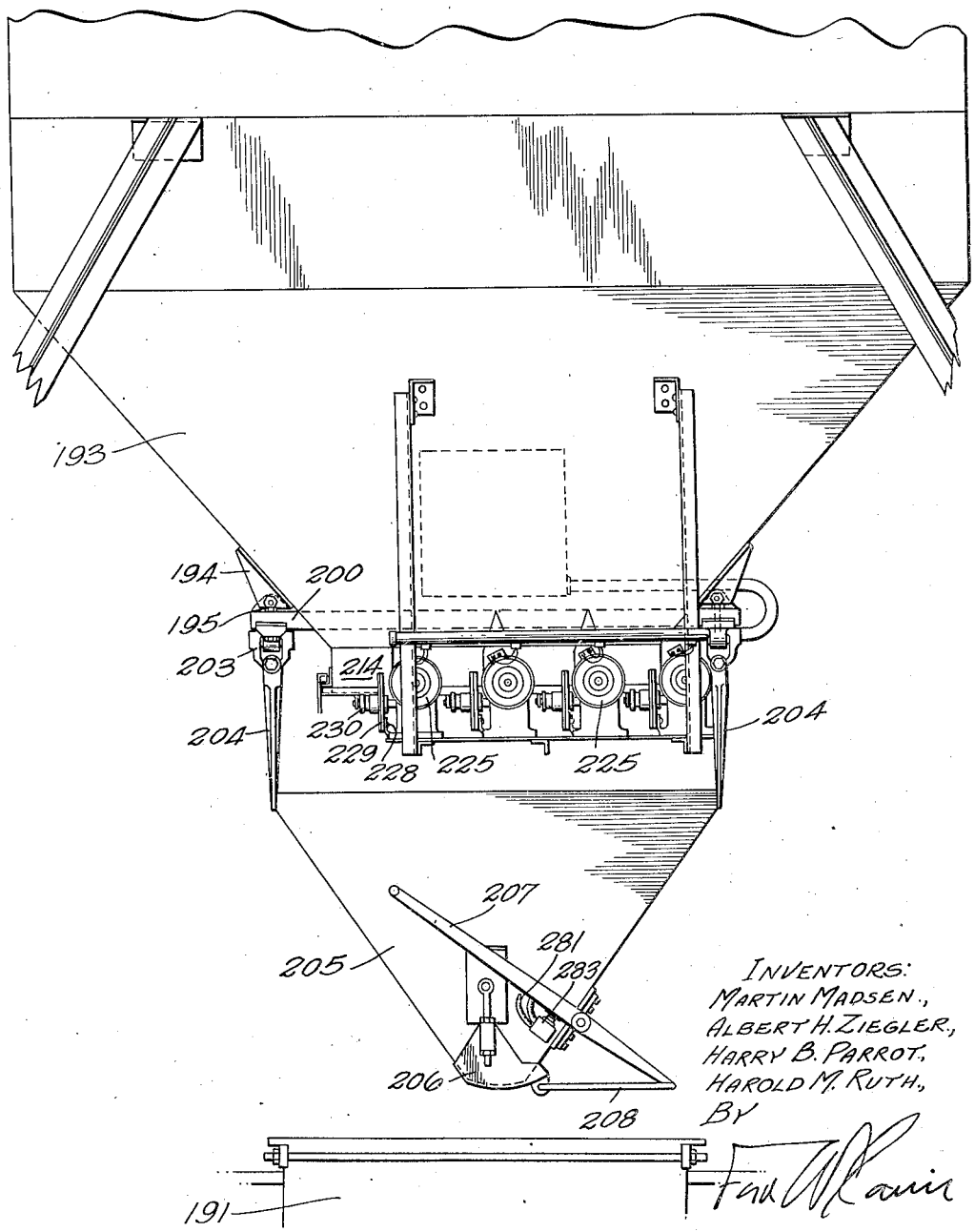

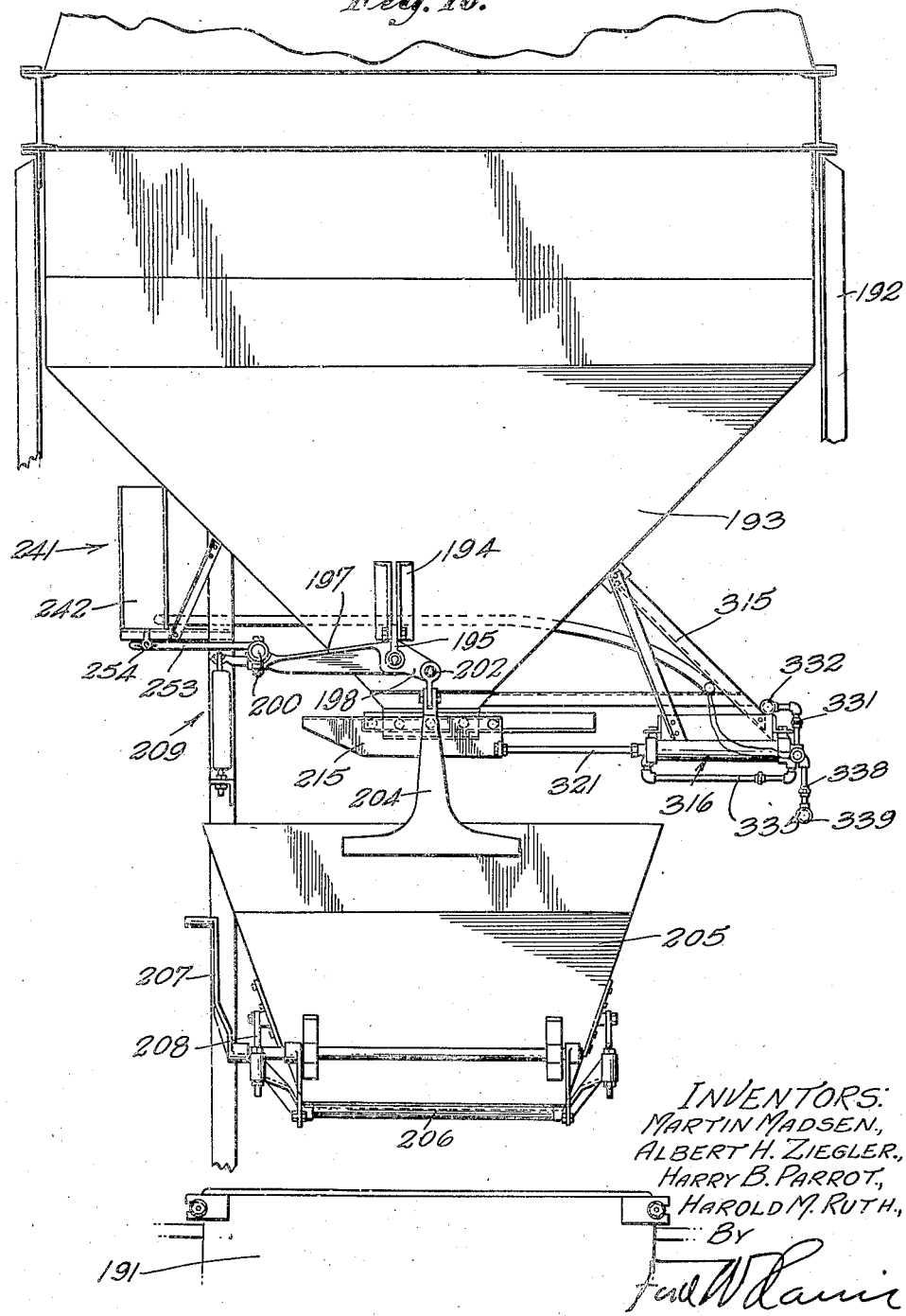

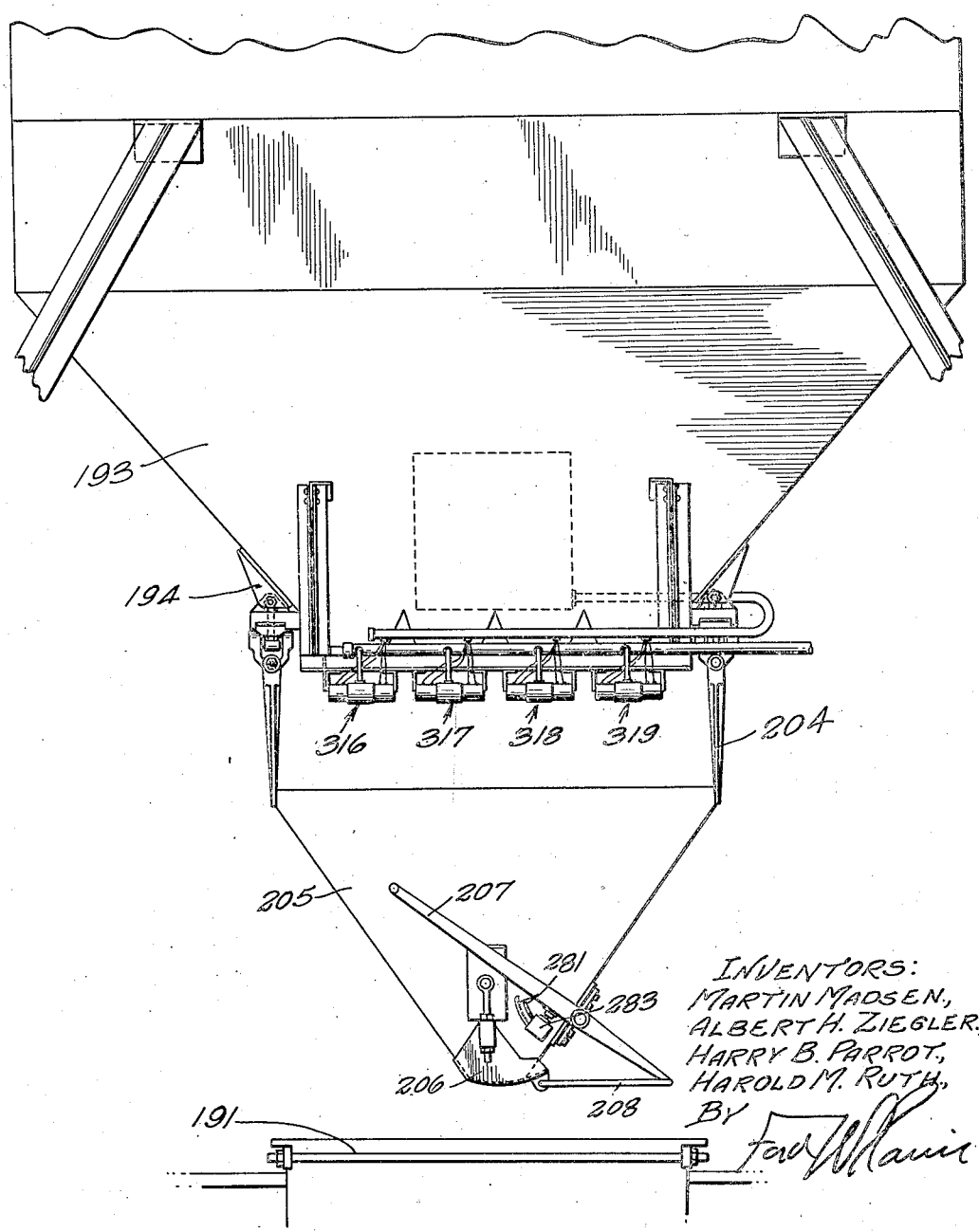

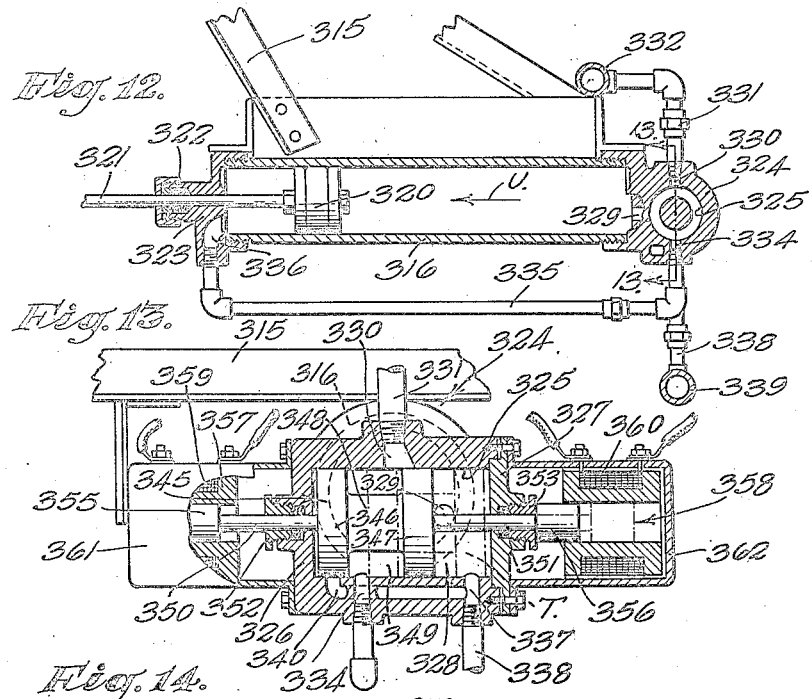
Fig. 12.
Fig. 13.
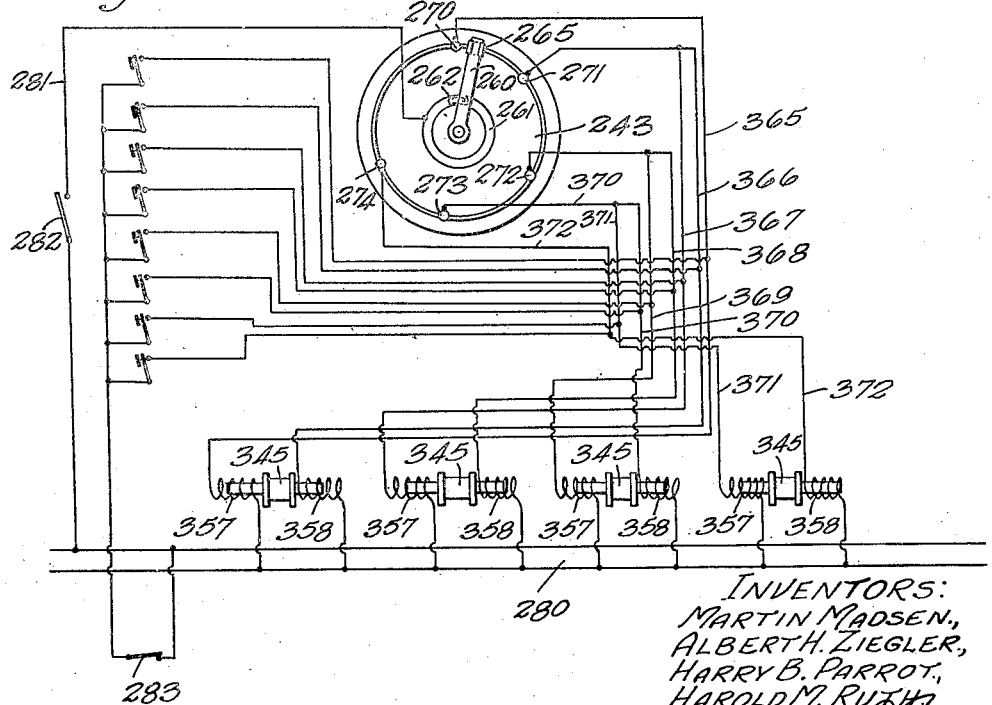
Fig. 14.
INVENTORS:
MARTIN MADSEN,
ALBERT H. ZIEGLER,
HARRY B. PARROT,
HAROLD M. RUTH
By Fred A. Lanier
ATTORNEY.

Patented Apr. 28, 1936

2,038,746

UNITED STATES PATENT OFFICE 2,038,746

ELECTRICALLY CONTROLLED AUTOMATIC WEIGHING DEVICE FOR PAVING PLANTS

Martin Madsen, Albert H. Ziegler, Harry B. Parrot, and Harold M. Ruth, Huntington Park, Calif., assignors to Madsen Iron Works, Ltd., Huntington Park, Calif., a corporation of California Application August 24, 1931, Serial No. 558,954

16 Claims. (Cl. 249—14)

Our invention relates to apparatus for automatically weighing materials and particularly to apparatus for automatically weighing and delivering to a bin a plurality of different types of materials. For example, our invention is of marked utility in the road making industry where apparatus for weighing mineral aggregates, gravel, sand, etc. is required.

In the road making industry it is highly important that the materials which compose the mixture be mixed together in certain predetermined proportions. On all government work governmental inspectors are continuously on the job and check the mixtures so that accuracy in proportioning all of the mixtures may be maintained.

It is an object of our present invention to provide an automatic electrically operated apparatus which includes a plurality of bins and a weigh-hopper and includes means for automatically delivering a predetermined amount of material contained in each of the bins to the weigh-hopper.

It is a further object of our invention to provide separate electrical circuits for opening and closing the gates for the hoppers in order that accurate operation may be obtained and in order that an adjustment of the amount of different materials may be readily made.

It is a further object of our invention to provide an apparatus of the character referred to heretofore in which each bin is provided with a gate and each gate is provided with a means for opening and closing the gate, and, further, in which there is a closing circuit and an opening circuit which is adapted to be closed at the proper time by means associated with the weigh-hopper.

It is a still further object of our invention to provide an apparatus of the character mentioned heretofore in which the gates for the hoppers are either steam or hydraulically operated or are operated by electric motors.

There are other objects which will be made evident in the following part of the specification and the appended claims, which might be more clearly understood with reference to the accompanying drawings.

Referring to the drawings:—

Figs. 1 to 9 inclusive illustrate the first form of our invention. Of these views—

Fig. 1 is a side elevational view of our automatic weighing device illustrating the included aggregate hopper, the weighing device, and the weigh-hopper, in combination with our asphalt mixing plant.

Fig. 2 is an elevational view of the invention, this view being taken as indicated by the arrow 2 of Fig. 1.

Fig. 3 is an enlarged vertical sectional view through the delivery chutes and gate members of the invention, this view having been taken as indicated by the line 3—3 of Fig. 1.

Fig. 4 is a fragmentary elevational view of that portion of the gate operating mechanism of the first form of the invention lying within the dotted circle 4 of Fig. 1.

Fig. 5 is a sectional view taken as indicated by the line 5—5 of Fig. 4.

Fig. 6 is a sectional view through the housing confining the control mechanism of the first form of the invention.

Fig. 7 is a vertical sectional view taken through the control mechanism as indicated by the line 7—7 of Fig. 6.

Fig. 8 is a fragmentary sectional view taken as indicated by the line 8—8 of Fig. 7.

Fig. 9 is a wiring diagram of the electrical control means and operating means of the first form of the invention.

Figs. 10 to 14 inclusive illustrate a second form of the invention. Of these figures—

Figs. 10 and 11 are views comparable to Figs. 1 and 2 respectively but illustrate a second form of gate operating mechanism.

Fig. 12 is a sectional view taken on a median plane through one of a plurality of cylinders included in the gate operating mechanism of the second form of the invention.

Fig. 13 is a vertical section through a valve member associated with one of the gate operating cylinders, this view being taken as indicated by the line 13—13 of Fig. 12.

Fig. 14 is a wiring diagram of the electrically operated controlling means of the second form of the invention.

Referring first to the first form of our invention as illustrated by Figs. 1 to 9 inclusive, and referring particularly to Figs. 1, 2, and 3, we show a mixing plant suitable for the production of asphaltic cement, generally designated by the numeral 190. The mixing plant includes a mixing device indicated by the numeral 191, above which is supported by suitable framework 192 an aggregate hopper 193 which comprises, as shown in Fig. 3, separate bins 210, 211, 212, and 213. Other parts included in ordinary types of asphalt mixing plants but having no relation to this invention have been omitted for the sake of convenience in the description.

Each of the bins 210, 211, 212, and 213, is provided with a delivery chute 214 adapted to deliver material from these bins into the weigh-hopper. The chutes 214 are relatively spaced, as shown in Fig. 3, and are axially aligned when viewed as in Fig. 1.

Supported on each side of the aggregate hopper 193 in the manner shown, by a suitable bracket 194, is a weigh-beam hanger 195, each providing a bearing 196 adapted to fulcrum a weigh-beam arm 197 on each side of the hopper 193 as shown. Each of the weigh-beam arms 197 is provided with a load end 198 extending inwardly on one side of the fulcrum 196 to a point approximately in the center of the hopper 193, and having a lever end 199 extending outwardly on the other side of the fulcrum 196 to a point beyond the end of the hopper 193, as shown. Extending laterally between the extreme outer ends of the lever ends 199 of the arms 197 is a cross member 200 which is rigidly bolted, as shown, to the arms 197, the arms 197 and the cross member 200 cooperating to form the weigh-beam 201 of the device.

Journalled by suitable bearings 202 to the load end of the weigh-beam 201 on each side of the hopper 193 is a hanger 203 to which is secured by brackets 204 a weigh-hopper 205. The weigh-hopper 205 is supported by the weigh-beam 201 in a position to receive by gravitational flow, material from the bins 210, 211, 212, and 213 through their respective chutes 214. The weigh-hopper 205 is provided with gate means in the form of a hinged gate 206. The gate 206 is manually operated by a lever 207 pivoted to the weigh-hopper 205 and connected to the gate 206 by a link 208 in the manner shown. As will be seen, the gate 206 of the weigh-hopper is positioned directly over the mixing device 191 so that the material may be delivered therefrom by gravitational flow into the mixing device.

The cross member 200 of the weigh-beam 201 is suitably connected, as shown in Fig. 1, to the operating mechanism of a suitable scale 209 adapted to register the weight of the material in the weigh-hopper 205 through the weigh-beam 201.

Each of the chutes 214 is closed by a gate member 215, the details of which will be described in connection with the bin 210 only, it being remembered that all of the gates are identical in construction and operation.

As best shown in Figs. 1 and 3, the bin 210 is provided with a track which comprises a pair of angles 216 each having a vertical leg 217 secured in any suitable manner to the outer walls of the chute 214, and each of which provides a leg 218 extending outwardly from the wall of the chute 214 at right angles thereto and in a horizontal plane. The forward ends of the angles 216, as viewed in Fig. 1, extend only slightly beyond the chute 214 and the extreme ends of the legs 218 thereof are turned upwardly as indicated at 219. Positioned on the horizontal legs 218 comprising the track are a plurality of rollers 220.

The gate member 215 comprises an elongated box-shaped body portion having side walls 221 extending vertically on each side of the chute 214 and the upper portions of which are bent inwardly throughout the length thereof to form horizontal rims 222 which rest upon the rollers 220. Suitably secured to and extending between the side walls 221 directly below and closely adjacent the bottom of the chute 214 is a horizontal plate 223 adapted to serve as a closure member for the chute 214. The rearward end of the plate 223, as viewed in Fig. 1, is turned upwardly to form a stop 224 adapted to contact the end of the chute 214 when the gate member 215 is closed. The rearward ends of the rims 222 are bent downwardly, as shown at 225' in Fig. 1, to form roller retaining means, the rollers 220 being confined between these downwardly bent portions 225' and the upwardly turned ends of the track legs 219. The gate member 215 is freely rollable on the rollers 220 between the position shown in solid lines in Fig. 1 to the open position indicated by dotted lines M of this figure.

Supported on a suitable platform included in the framework 192 adjacent the rearward end of each of the gate members 215 is a gate operating means in the form of an electric motor 225. Each of the motors is provided with a gear reduction unit 226 of the self-locking worm type. Projecting from one side of each of the units 226 is a driven shaft 227, the axis of which is at right angles to the axis of rotation of the motor 225, as shown in Fig. 5. Supported adjacent each of the units 226 is a circuit breaking means generally designated by the numerals 228, 228a, 228b, and 228c, each of which includes a contact plate 229 preferably circular in form, and through which the shafts 227 of the associated units 226 axially extend. Suitably secured to each of the shafts 227 closely adjacent the outer face of the associated plate 229 is a crank 230. The cranks 230 associated with the circuit breakers 228, 228a, 228b, and 228c are respectively connected to the gate members 215 of the bins 210, 211, 212, and 213 by a link 231 in the manner shown. As best shown in Figs. 4 and 5, the contact plate of each of the circuit breakers is formed of an insulating material and is provided with a pair of concentric semi-circular contact segments 232 and 233 set in the outer surface thereof. Carried by each of the rotatable cranks 230 is a pair of electrical contacts 234 and 235 positioned in such a manner as to engage the segments 232 and 233 of the associated circuit breakers as the cranks 230 are rotated. As best shown in Fig. 4, the semi-circular segments 232 and 233 of each circuit breaker are relatively positioned in such a manner that when the associated crank 230 is in the position in which it is shown in solid lines in Fig. 4, with the gate member associated therewith closed, the contact 234 is in contact with the segment 232, and the contact 235 is out of contact with the segment 233, as shown. When the crank 230 has been rotated from this position to the position indicated by dotted lines N of Fig. 4, to open the gate member associated therewith, the contact 234 has broken contact with the segment 232, and the contact 235 has made contact with the segment 233, thus for half of one revolution of the crank 230, and contact 234 is in contact with the segment 232, and during the other half of the revolution the contact 235 is in contact with the segment 233, the contacts making and breaking contact with their respective segments simultaneously. Also secured to the outer face of the plate 229 of each circuit breaker is an annular collector ring 236 adapted to be continuously contacted by a brush member 237 mounted on the rotatable crank 230. The brush member 237 is electrically connected to both of the contacts 234 and 235 by a conductor strip 238 suitably insulated from the crank 230 as shown in Fig. 5.

Supported by suitable bracket means 240 adjacent the cross member 200 of the weigh-beam 201 is an electrical control mechanism generally designated by the numeral 241. With reference to Figs. 6, 7, and 8, the control means 241 includes a box 242 having a contact dial 243 therein. The dial 243 is formed preferably of a plurality of concentric rings 244 supported on a suitable spider 245 which in turn is secured to the walls of the box 242. The concentric rings 244 are of such a size and are relatively spaced in such a manner as to form concentric slots 246 between each of these rings. The central portion of the dial 243, cooperating to form the inner wall of the innermost concentric slot 246, may be a solid circular portion as shown.

Secured to the spider member 245 on one side of the dial 243 is a bearing 247 adapted to journal a shaft 248 which projects through the center of the dial 243. Secured on the end of the shaft 248 on one side of dial 243 and adjacent the bearing 247 is a pinion 249 adapted to mesh with a vertically extending rack 250 slidably supported in a pair of suitable brackets 251. The brackets 251 are provided with vertically disposed, T-shaped grooves 252 adapted to slidably receive the rack 250 which is T-shaped in cross-section, as best shown in Fig. 8. The rack 250 extends downwardly through an opening 253 in the bottom of the box 242, as shown in Fig. 7. The lower end of the rack 250 is connected by a pin and slot connection 254 to an arm 255 rigidly secured to and extending outwardly from the cross member 200 of the weigh-beam in such a manner that the reciprocating movement of the weigh-beam will be transmitted to the slidable rack 250 which cooperates with the pinion 249 to convert this reciprocating motion to rotate the shaft 248.

Mounted on the opposite end of the shaft 248 on the other side of the dial 243 is a contact arm 260 which extends radially over and closely adjacent the outer face of the dial 243, as shown in Figs. 6 and 7. Secured to the outer face of the dial 243 within the innermost concentric slot 246 is a collector ring 261 adapted for continuous contact with a brush means 262. The contact arm 260 is preferably formed of an insulating material and the brush 262 is carried by a conductor strip 263 extending longitudinally throughout the length of the arm 260. Slidably mounted on the contact arm and in constant engagement with the conductor strip 263, as best shown in Fig. 8, is a suitable carbon brush member 265 of any suitable type capable of being positioned over any one of the concentric slots 246, there being suitable grasping means 266 provided for the manual adjustment thereof.

Adjustably secured in each of the circular slots 246 is a plurality of contacts 270, 271, 272, 273, and 274, each of which comprises a threaded screw 275 extending through the slot 246 with the head portion 276 thereof disposed for contact with the brush member 265, and a nut 277 threadedly engaging the screw 275 on the opposite side of the dial for the purpose of clamping the contacts 270, 271, 272, 273, and 274 in any desired relatively spaced position in the slot 246 so that the head portion 276 thereof will be consecutively engaged by the brush member 265 as the arm rotates.

Referring now to the wiring diagram of Fig. 9, in this form of our invention we show for the sake of convenience only one of the circular slots 246 in which are positioned the contacts 270, 271, 272, 273, and 274.

Connecting the collector ring 261 with one side of a source of current indicated at 280 is a conductor 281 in which is interposed a manually operable switch 282. A suitable circuit breaker 283 may also be optionally interposed in the conductor 281 and may be so positioned relative to the operating lever 207 of the weigh-hopper gate 205, as shown in Fig. 2, that when the lever 207 is manipulated to open the gate 205, the circuit including the conductor 281 is broken. Connecting the first of the contacts, such as the contact 270, with the segment 232 of the circuit breaker 228 is a conductor 284. Connecting the second contact 271 with the segment 233 of the same circuit breaker 228 is a conductor 285. Connecting the collector ring 236 of the circuit breaker 228 with the other side of the current source 280 is a conductor 286. Interposed in the conductor 286 is a coil 287 included in a magnetically operated switch 288 connected in a motor circuit 289, the coil 287 when energized being operable to close the switch 288 to complete the motor circuit 289 in a well known manner.

The conductor 281, the collector ring and brush means 261 and 262, the brush member 265, the contact 270, the conductor 284, the segment 232 of the circuit breaker 228, the collector ring and brush 236 and 237, the conductor 286, and the coil 287 constitute a complete control circuit for controlling the motor circuit 289 of the motor 225 associated as before described with the bin 210. This control circuit we will hereinafter call the gate opening control circuit of the bin 210. Likewise, the conductor 281, the collector ring and brush means 261 and 262, the brush member 265, the contact 271, the conductor 285, the segment 233 of the circuit breaker 228, the collector ring and brush 236 and 237, the conductor 286, and the coil 287 constitute a second complete control circuit for controlling the motor circuit 289 of the motor 225 associated with the bin 210. This control circuit we will hereinafter call the closing control circuit of the bin 210.

Each of the remaining bins 211, 212, and 213 has a gate opening control circuit and a gate closing control circuit. The opening circuit of the bin 211 includes the contact 271 of the dial 243, and a conductor 290 connecting the conductor 285 with the segment 232 of the circuit breaker 228a, as shown. The gate closing control circuit of the bin 211 includes the next consecutive contact 272 of the dial 243 and a conductor 291 connecting the contact 272 and the segment 233 of the circuit breaker 228a.

The gate opening and closing circuits of the bin 212 include respectively the contact 272 and a conductor 292 connecting the conductor 291 of the segment 232 of the circuit breaker 228b and a conductor 293 connecting the next consecutive contact 273 to the segment 233 of the circuit breaker 228b, as shown.

The bin 213 is also provided with a gate opening and a gate closing circuit which respectively include a conductor 294 connecting the conductor 293 with the segment 232 of the circuit breaker 228c and a conductor 295 connecting the next consecutive contact 274 of the dial 243 with the segment 233 of the circuit breaker 228c, as shown.

The operation of this form of our invention is as follows:

With all of the gate members 215 of the bins 210, 211, 212, and 213 closed and with the weigh-hopper 205 empty and the gate 206 thereof closed, the main switch 282 in the conductor 281 may be closed. With the weigh-hopper 205 empty, the contact arm 260 is in contact with the contact 270 which is the first in the circular series of relatively spaced contacts in one of the circular slots 246. As the switch 282 is closed, the opening circuit of the bin 210, described above, is completed, energizing the included coil 287 through the segment 232 and the contact 234 of the circuit breaker 228, thus closing the switch 288 to energize the motor circuit associated therewith. When the motor 225 is energized, the shaft 227 is driven through the reduction gear 226 to rotate the arm 230 in the direction of the arrow O of Fig. 4, pulling the link 231 in the direction of the arrow P of Fig. 1 to open the gate 215. When the arm 230 reaches the position indicated by the dotted lines N of Fig. 4, the contact 234 breaks contact with the segment 232 of the circuit breaker 228, as before described, and the coil 287 is deenergized, stopping the motor 225. With the arm 230 in the position N, the gate 215 of the bin 210 is in the fully open position indicated by dotted lines M of Fig. 1. If desired, magnetic brakes of any ordinary type may be used to stop the motors 225 at the instant they are deenergized. This, however, is not necessary if the speed ratio between the motors and the driven shafts 227 of the gear reduction units 226 is such that the movement of the gate members is comparatively slow.

When the gate member 215 of the bin 210 is thus opened, material from the bin 210 flows into the weigh-hopper 205. As this material flows into the weigh-hopper the increasing weight thereof is registered through the weigh-beam 201, the ends 198 of the arms 197 swinging downwardly and the lever ends 199 and the cross member 200 swinging upwardly, as correspondingly indicated by the arrows Q and R of Fig. 1. This upward movement of the cross member 200, the member 200 being connected to the mechanism of the scale 209, actuates the mechanism of the scale to weigh the material being delivered into the weigh-hopper, the weight being registered on the scale dial by the pointer of the scale in a well known manner.

This upward movement of the lever ends 199 of the arms 197 also moves the rack 250 upwardly and rotates the pinion 249 and the shaft 248, causing the contact arm to swing in the direction of the arrow S of Figs. 6 and 9.

As before stated, the movement of the weigh-beam 201 is registered by the mechanism of the scale 209 connected thereto.

It will be seen that the increasing weight of the material flowing from the bin 210 into the weigh-hopper will cause the contact arm 260 to move continuously in the direction of the arrows S of Figs. 6 and 9 until the brush member 265 engages the contact 271. When this occurs the above described gate closing circuit of the bin 210 will be energized through the conductor 285 and the segment 233 of the circuit breaker 228 to again energize the coil 287 and again close the switch 288, again energizing the motor 225 to continue the rotation of the arm 230 in the direction of the arrow O of Fig. 4, this movement continuing until the contact 235 runs off of the segment 233, whereupon the gate closing circuit is broken, with the gate 215 of the bin 210 in closed position. As the gate closing circuit of the bin 210 is completed by the brush member 265 engaging the contact 271, it will be seen that by reason of the fact that the conductor 290 is connected to the conductor 285, the gate opening circuit of the bin 211 is simultaneously energized through the conductor 290 and the segment 232 of the circuit breaker 228a, causing the gate 215 of the bin 211 to be opened simultaneously with the closing of the gate 210.

Likewise the gate closing circuit of the bin 211 and the gate opening circuit of the bin 212 will be simultaneously energized when the brush member engages the contact 272 of the dial 243. Further movement of the contact arm 260 in the direction of the arrow S due to the increasing weight of the material delivered into the weigh-hopper, brings the brush member 265 into engagement with the contact 273 to simultaneously energize the gate closing circuit of the bin 212, and the gate opening circuit of the bin 213, and, ultimately, into engagement with the contact 274 to energize the gate closing circuit of the bin 213.

When all of the gate members 215 of the bins 210, 211, 212, and 213 have thus been opened and closed to deliver certain predetermined amounts of various materials into the weigh-hopper as registered in pounds on the scale, the aggregate now contained in the weigh-hopper 205 represents a batch of material having balanced proportions of each material, suitable for subsequent mixing by any suitable devices such as the mixing device 191.

As the gate 206 of the weigh-hopper is opened, allowing the material therein to flow into the mixing device 191, it will be seen that the decreasing weight of the material will allow the weigh-beam 201 to move in the direction opposite to that indicated by the arrow R of Fig. 1, causing the rack 250 and the pinion 249 to operate to move the contact arm in the direction opposite to that indicated by the arrows S of Figs. 6 and 9, returning it to the position in which the brush member 265 engages the contact 270 when the weigh-hopper 205 is empty. It will be understood that while the gate 206 of the weigh-hopper 205 is open, the circuit breaker 283 associated therewith is open, as before described, thus none of the circuits can be energized as the brush member 265 on its return movement engages the contacts of the dial 243. When the weigh-hopper has been emptied and with the brush member 265 again engaging the contact 270, the gate 206 of the weigh-hopper may be closed again, completing the opening circuit of the bin 210, starting the sequence of operation to weigh a second batch of materials.

Manual operation of this form of our invention is provided for by means of a plurality of manually operable switches 300, 301, 302, 303, 304, 305, 306, and 307. One side of each of these switches is connected to a conductor 309 leading to the current source 280. The other sides of these switches are connected by conductors, as shown, respectively to the conductors 284, 285, 290, 291, 292, 293, 294, and 295, between the dial member 243 and the circuit breakers 228, 228a, 228b, and 228c. It will be clearly seen that if it is desired to operate the weighing device manually, the switch 282 in the conductor may be opened to render the dial 243 inoperative and one of the manual switches, such as the switch 300, may be closed to complete the opening circuit of the bin 210 through the conductor 309, the switch 300, the conductor 284, the segment 232 of the circuit breaker 228, the conductor 286, and the coil 287 to energize the motor circuit 288, as before described.

When the gate member 215 of the bin 210 is opened, the operator in charge may open the switch 300 and when a certain predetermined amount of material has been allowed to flow from the bin 210 into the weigh-hopper, as registered by the scale 209, the switch 301 is closed, completing the closing circuit of the bin 210 through the conductor 309, the switch 301, the conductor 285, the segment 233 of the circuit breaker 228, the conductor 286, and the coil 287 to again energize the motor circuit 289 to close the gate of the bin 210. It will be understood that the sequence of operation of the manual control switches is optional with the operator, it being possible to operate any of the circuits to open the gate of any bin as desired, the operator closing each bin when the proper weight of material has been delivered from each bin.

Should it be desired to change the proportioning of the mixture between batches, the conductors 284, 285, 290, 291, 292, 293, 294, and 295 may be disconnected from their respective contacts in the outermost circular slot 246 and respectively connected to the contacts 270, 271, 272, 273, and 274 of any of the slots 246, these contacts in the various sets having been previously positioned to cause the operation of the gate members to deliver various mixes into the weigh-hopper. Suitable slip couplings of any well known type may be used in connecting the conductors to the contacts to facilitate changing the conductors from one series of contacts to another.

We will now described the construction of the second form of our invention with reference to Figs. 10 to 14 inclusive. This form of our invention is identical with the above described first form of our invention with the exception of the gate operating mechanism. The parts including the bins, the weigh-hopper, the weigh-beam, the scale and the control means being exactly the same, we will dispense with all detailed description of these parts and characterize all identical parts of the second form with the same numerals used in the first form.

Supported by suitable framework 315 secured to the aggregate hopper 193 adjacent the rearward ends of the gate members 215 is a plurality of cylinders 316, 317, 318, and 319, respectively, axially aligned with the gate members 215 of the bins 210, 211, 212, and 213. Each of the cylinders is provided with a piston 320 adapted for reciprocation therein. Each of the pistons 320 is provided with a connecting rod 321 extending through a gland 322 provided in a cap member 323 closing the forward end of each of the pistons as shown, these connecting rods of the cylinders 316, 317, 318, and 319 being respectively connected to the gate member 215 of the bins 210, 211, 212, and 213.

Each of the cylinders 316 to 319 inclusive is identical in construction and operation and we will therefore describe only one cylinder such as the cylinder 316, singly. Closing the rearward end of the cylinder 316 is a cap member 324 having a bore 325 formed therein, the axis of which is perpendicular to the longitudinal axis of the cylinder 316. The bore 325 has a closed end 326 and an open end, the latter being closed by a cover plate 327 to form a closed valve chamber 328, as shown best in Fig. 13. Communicating between the valve chamber 328 and the interior of the cylinder 316 on one side of the piston 320 is a fluid passage 329. Communicating between the valve chamber 328 and the exterior thereof is a fluid inlet orifice 330 to which is threadedly connected a fluid inlet pipe 331 connected to a fluid supply manifold 332. Communicating also with the valve chamber is a relay duct 334 into which is threadedly connected a fluid conducting pipe 335, the other end of which is threadedly connected to a passage 336 formed in the forward cap 323, the passage 336 communicating with the interior of the cylinder 316 on the other side of the piston 320, as shown. Communicating with one end of the valve chamber 328 as shown is a discharge port 337 into which is threaded a discharge pipe 338, connected in turn to an exhaust manifold 339. Formed in the wall of the valve chamber and communicating between the discharge port 337 and the other end of the valve chamber, as shown, is a by-pass discharge port 340.

Positioned in the valve chamber 328 is a valve member 345 adapted for reciprocation therein. The valve member 345 is spool shaped in form and comprises end portions 346 and 347 of a diameter conforming to the interior diameter of the chamber 328 and a reduced diameter central portion 348, providing an annular space 349 between the portion 348 and the walls of the valve chamber 328, as shown. Integral with, or otherwise secured in axial relationship with the valve member 345, are a pair of valve rods 350 and 351. The rod 350 projects outwardly through a gland 352 provided in the closed end 326 of the chamber 328 and the rod 351 projects outwardly through a gland 353 provided in the cover plate 327. Secured to the outer ends of the rods 350 and 351 are magnets 355 and 356 respectively included in a pair of solenoids 357 and 358 having coils 359 and 360 respectively for a purpose well known in the art. The solenoids 357 and 358 are supported at opposite ends of the valve chamber 328 by housings 361 and 362 in the manner shown in Fig. 13.

The solenoid 357 we will hereinafter refer to as the gate opening solenoid of the bin 210, and the solenoid 358 we will hereinafter refer to as the gate closing solenoid of the bin 210.

Referring to the wiring diagram of Fig. 14, we show the dial member 243 having the circular series of contacts 270, 271, 272, 273, and 274, which contacts comprise parts of a plurality of gate opening and gate closing circuits, wired in the following manner.

Connecting the first contact 270 to one side of the coil 359 of the gate opening solenoid 357 and the other side of the coil 359 to the source of current 280 is a conductor 365, this conductor 365 together with the conductor 281, the collector ring and brush means 261 and 262, the arm 260, the brush member and the contact 270, comprising the gate opening circuit of the bin 210.

Connecting the contact 271 with one side of the coil 360 of the gate closing solenoid 358 and the other side of the coil 360 to the source of current 280 is a conductor 366, this conductor together with the conductor 281, the collector ring and brush means 261 and 262, the arm 260, the brush member 265 and the contact 271 comprising the gate closing circuit of the bin 210.

Each of the remaining cylinders 317, 318, and 319 is provided with a gate opening solenoid 357 and a gate closing solenoid 358.

Connected to the conductor 366, as shown, is a conductor 367 which includes the opening solenoid 357 of the cylinder 317 and completes the opening circuit of the bin 211. Connected to the contact 272 of the dial 243 is a conductor 368 which includes the closing solenoid 358 of the cylinder 317 and completes the closing circuit of the bin 211.

Connected to the conductor 368, as shown, is a conductor 369 which includes the opening solenoid 357 of the cylinder 318 and completes the opening circuit of the bin 212. Connected to the contact 273 of the dial 243 is a conductor 370 which includes the closing solenoid 358 of the cylinder 318 and completes the closing circuit of the bin 212.

Connected to the conductor 370, as shown, is a conductor 371 which includes the opening solenoid 357 of the cylinder 319 and completes the opening circuit of the bin 213. Connected to the last contact 274 of the dial 243 is a conductor 372 which includes the closing solenoid 358 of the cylinder 319 and completes the closing circuit of the bin 213.

The operation of this form of our invention is as follows:

With the valve members 345 associated with each of the cylinders in the position indicated by the dotted lines T of Fig. 13, it will be seen that steam under pressure is delivered into the valve chambers 328 simultaneously from the manifold 332 through the inlet orifices 330. The orifices 330 being in communication with the fluid passages 329 through the spaces 349 of the valves 345, it will be clear that steam under pressure will be simultaneously delivered into all of the cylinders forcing the pistons 320 outwardly in the direction of the arrow U of Fig. 12, and preventing the opening of any of the gates 215.

It will also be clearly seen by an inspection of Fig. 13 that with the valves in this position the discharge ports 337 and the associated exhaust manifold 339 are in communication with the forward ends of the pistons, through the passages 336, the pipes 335, the relay ducts 334, and the by-passes 340.

With the contact arm in such a position that the brush member 265 engages the contact 270, the switch 282 in the conductor 281 is closed, which completes the opening circuit of the bin 210, energizing the coil 359 of the opening solenoid 357, which draws the magnet toward the coil 359, so that the valve member 345 is moved from the dotted position T to the position shown in solid lines in Fig. 13. As this occurs, it will be seen that the steam pressure in the cylinder 316 on one side of the cylinder will be exhausted through the fluid passage 329 and the discharge port 337 into the exhaust manifold 339, and at the same time steam under pressure will be delivered from the manifold 332 through the inlet orifice 330, through the space 349 of the valve 345 and through the relay duct 334, the pipe 335, and the passage 336 into the cylinder on the other side of the piston, moving the piston in the direction opposite to the direction indicated by the arrow U of Fig. 12, and thereby pulling the gate 215 of the bin 210 into its open position, where it is held by steam under pressure until the valve is again actuated.

When a sufficient quantity of material has been delivered from the bin 210 to move the arm 260 and the brush member 265 into a position to engage the contact 271, the closing circuit of the bin 210 and the opening circuit of the bin 211 are simultaneously completed to energize the closing solenoid 358 of the bin 210 to move the return valve 345 associated therewith to the dotted position T, closing the gate, and to energize the opening solenoid 357 of the bin 211, to move the valve member 345 associated therewith, to open the gate of the bin 211, in the manner just described in connection with the bin 210.

In view of the description of the operation of the controlling means of the first form of the invention, and from the description of the operation of the first of the gate opening and closing circuits of the present form of the invention just described, it will be perfectly clear that as the brush member 265 consecutively engages the contacts 270, 271, 272, 273, and 274, the opening and closing circuits of each of the bins 210, 211, 212, and 213 will be successively completed, causing the respective gate members 215 thereof to be opened one at a time, to deliver a predetermined amount of material from each of the bins, this amount being registered by the scale 209.

It will be at once apparent that should any one of the bins of either the first or second forms of our invention become empty before the full specified amount of material has been delivered therefrom, the entire automatic control mechanism will be rendered inoperative until the required weight of material has been supplied to the weigh-hopper to operate the control means to close the gate of that particular bin.

In connection with the second form of the invention, we have also shown manually operable switches and conductors comparable to the manual switches 300 to 307 inclusive of the first form, and in view of the description of operation in connection with these switches in the first form and the simplicity of the manner in which they operate, we will dispense with the description thereof.

In the drawings and description disclosing the various forms of this invention, we have purposely omitted numerous details of construction and the description thereof that were not essential to the operation of the invention, and have shown only simple operative mechanisms for operating the control means and the gate operating means of the first and second forms of our invention. It should be understood, however, that we do not wish to limit our invention to these simple details or to limit the invention to any of the details of construction disclosed herein, as the true scope of our invention is defined by the following claims.

We claim as our invention:

1. In a weighing device of the character described, the combination of: a weigh-hopper; gate means for controlling the discharge of material from said weigh-hopper; weighing means associated with said weigh-hopper for weighing the contents thereof; a plurality of supply means adapted to supply material to said weigh-hopper; a control means for each of said supply means movable between supplying and non-supplying positions; electrically operated means for each of said control means for moving same between their two positions; an electrical motor circuit connected to each of said electrically operated means for energizing same; a contact arm operatively connected to said weighing means and being movable upon the increasing of the contents of said weigh-hopper; a brush member mounted on said contact arm; a dial member suitably supported adjacent said contact arm; a series of electrical contacts positioned on said dial member and adapted for consecutive contact by said brush member as said arm is moved; a plurality of electric control circuits associated with each of said motor circuits, each control circuit being suitably connected with a source of electrical current and including said brush member, one of said contacts, and a means for controlling said motor circuit; circuit-breaking means in each of said control circuits, said circuit-breaking means being operable to complete one of said control circuits to energize said motor circuit associated therewith when said brush member contacts one of said contacts and to break said circuit when said control means associated with the motor of said circuit is in fully opened position to allow said material to flow from said supply means into said weigh-hopper, and said circuit-breaking means being operable to complete the other of said control circuits to again energize said motor circuit when said brush member engages the successive contact and to break said circuit when said control means is in fully closed position; and circuit-breaking means associated with said weigh-hopper to break all of said circuits when said gate means of said weigh-hopper is open.

2. In a weighing device of the character described, the combination of: a weigh-hopper; weighing means associated with said weigh-hopper for weighing the contents thereof; a plurality of supply means adapted to supply material to said weigh-hopper; a control means for each of said supply means movable between supplying and non-supplying positions; electrically operated means for each of said control means for moving same between their two positions; an electrical motor circuit connected to each of said electrically operated means for energizing same; a contact arm operatively connected to said weighing means and being movable upon the increasing of the contents of said weigh-hopper; a brush member mounted on said contact arm; a dial member suitably supported adjacent said contact arm; a series of electrical contacts positioned on said dial member and adapted for consecutive contact by said brush member as said arm is moved; a plurality of electric control circuits associated with each of said motor circuits, each control circuit being suitably connected with a source of electrical current and including said brush member, one of said contacts, and a means for controlling said motor circuit; and circuit-breaking means in each of said control circuits, said circuit-breaking means being operable to complete one of said control circuits to energize said motor circuit associated therewith when said brush member contacts one of said contacts and to break said circuit when said control means associated with the motor of said circuit is in fully opened position to allow said material to flow from said supply means into said weigh-hopper, and said circuit-breaking means being operable to complete the other of said control circuits to again energize said motor circuit when said brush member engages the successive contact and to break said circuit when said control means is in fully closed position.

3. In a weighing device of the character described, the combination of: a weigh-hopper; weighing means associated with said weigh-hopper for weighing the contents thereof; a plurality of supply means adapted to supply material to said weigh-hopper; a control means for each of said supply means movable between supplying and non-supplying positions; electrically operated means for each of said control means for moving same between their two positions; an electrical motor circuit connected to each of said electrically operated means for energizing same; a contact arm operatively connected to said weighing means and being movable upon the increasing of the contents of said weigh-hopper; a brush member adjustably mounted on said arm and movable over the length thereof; a dial member suitably supported adjacent said contact arm; a plurality of series of electrical contacts adjustably positioned on said dial, each of said contacts in any one series being adapted for consecutive contact by said brush member as said arm is moved; a plurality of electric control circuits associated with each of said motor circuits, each control circuit being suitably connected with a source of electric current and including said brush member, one of said contacts included in one of said circular series, and means for controlling one of said motor circuits; means for connecting each of said control circuits to consecutive contacts in any one of said series; and circuit-breaking means in each of said control circuits, said circuit-breaking means being operable to complete one of said control circuits to energize said motor circuit associated therewith when said brush member contacts one of said contacts and to break said circuit when said control means associated with said electrically operated means is fully opened to allow said material to flow from said supply means into said weigh-hopper, and said circuit-breaking means being operable to complete the other of said control circuits to again energize said motor circuit when said brush member engages the successive contact and to break said circuit when said control means is fully closed.

4. In combination: a plurality of bins, each of which is provided with a delivery chute; a weigh-beam; a scale; a hopper operably supported by said weigh-beam in position to receive material from said delivery chutes, said hopper having a delivery opening therein; gate means normally closing said opening in said hopper; a gate member associated with each of said delivery chutes and normally closing said chute; a plurality of electric motors, each of which is connected to one of said gate members so as to move said gate member from closed position to open position and from open position to closed position; and mechanism operable to energize said motors to open and close said gate members in succession to allow material to flow from each of said bins consecutively into said hopper, the weight of said material being registered through said weigh-beam on said scale.

5. In combination: an aggregate hopper comprising a plurality of bins, each of which is provided with a delivery chute; a scale; a weigh-beam in indicating relationship with said scale; a weigh-hopper operably supported by said weigh-beam in a position to receive material from said delivery chutes of said bins, said weigh-hopper having a delivery opening; gate means normally closing said opening; a gate member associated with each of said delivery chutes and normally closing that one of said chutes with which it is associated; a plurality of electric motors; a driven shaft associated with each of said motors; linkage connecting each of said driven shafts to one of said gate members, said linkage being operable to open and close said gate member as said associated driven shaft is rotated by one of said motors; locking means for locking said gate members in fully open and fully closed positions, said locking means being releasable when said motors are energized; means associated with each of said motors to stop said motors when said driven shafts have operated said linkage to open said gate members and to again stop said motors when said linkage has been operated to again close said gate members; and means associated with said weigh-beam and operable by the movement thereof to energize each of said motors to open and then close each of said gate members in turn to allow material to flow from each of said bins into said weigh-hopper, the weight of said material being registered through said weigh-beam of said scale.

6. In combination: an aggregate hopper comprising a plurality of bins, each of which is provided with a delivery chute; a scale; a weigh-beam in indicating relationship with said scale; a weigh-hopper operably supported by said weigh-beam in a position to receive material by gravitational flow from said delivery chutes of said bins, said weigh-hopper having a delivery opening; gate means normally closing said opening; a gate member associated with each of said delivery chutes and normally closing that one of said delivery chutes with which it is associated; a plurality of electric motors; a driven shaft connected to each of said motors; linkage connecting each of said driven shafts to one of said gate members, said linkage being operable to open and close said gate members as said associated driven shaft is rotated by one of said motors; locking means for locking said gate members in fully open and fully closed positions, said locking means being releasable when said motors are energized; means associated with each of said motors to stop said motors when said driven shafts have operated said linkage to open said gate members and to again stop said motors when said linkage has been operated to again close said gate members; means associated with said weigh-beam and operable by the movement thereof to energize each of said motors to open and then close each of said gate members in turn to allow material to flow from each of said bins in turn into said weigh-hopper, the weight of said material being registered through said weigh-beam of said scale; and means for preventing any of said motors being energized when said gate means of said weigh-hopper is open.

7. In combination: a plurality of bins, each of which is provided with a delivery chute; a weigh-beam; a hopper connected to said weigh-beam in position to receive material from said chutes, said weigh-beam being moved as a function of the weight of material in said hopper, and said hopper having a discharge opening therein; gate means normally closing said opening; a gate member associated with each of said chutes and normally closing said chute; an electric motor for each of said gate members; a driven shaft associated with each of said motors; means connecting each of said driven shafts to one of said gate members so that rotation of said driven shafts moves said gate members between open and closed positions; and mechanism operable in response to movement of said weigh-beam to successively energize said motors, each of said motors being energized to open and close its associated gate member before the succeeding gate member is opened and closed.

8. A gate operating mechanism for use on weighing apparatus having a weigh-hopper, weighing means associated with said weigh-hopper for weighing the contents thereof, and a plurality of supply means adapted to supply material to said weigh-hopper comprising: discharge control means for each of said supply means movable between supplying and non-supplying positions; operating means for each of said control means for moving same between their two positions; electrically operated actuating means for each of said operating means; an electrical circuit connected to each of said actuating means for energizing same; a contact arm operatively connected to said weighing means, said contact arm being movable upon the increasing of the contents of said weigh-hopper; a brush member mounted on said contact arm; a dial member adjacent said contact arm; and a series of electrical contacts positioned on said dial member and adapted for consecutive contact by said brush member as said arm is moved, said electrical contacts, said brush member and said circuit being electrically connected so that said actuating means is energized when said brush member contacts the first of said contacts to move said discharge control means of the first of said supply means to open position, and said actuating means is energized when said brush member contacts a succeeding one of said contacts to simultaneously move the discharge control means of one of said supply means to closed position and move the discharge control means of the succeeding one of said supply means to open position.

9. A gate operating mechanism for use on weighing apparatus having a weigh-hopper, weighing means associated with said weigh-hopper for weighing the contents thereof, and a plurality of supply means adapted to supply material to said weigh-hopper, comprising: discharge control means for each of said supply means movable between supplying and non-supplying positions; operating means for each of said control means for moving same between their two positions; electrically operated actuating means for each of said operating means; an electrical circuit connected to each of said actuating means for energizing same; a contact arm operatively connected to said weighing means, said contact arm being movable upon the increasing of the contents of said weigh-hopper; a brush member mounted on said contact arm; a dial member adjacent said contact arm; and a series of electrical contacts positioned on said dial member and adapted for consecutive contact by said brush member as said arm is moved, said electrical contacts, said brush member and said circuit being electrically connected so that said actuating means is energized when said brush member contacts the first of said contacts to move said discharge control means of the first of said supply means to open position, and said actuating means is energized when said brush member contacts a succeeding one of said contacts to simultaneously move the discharge control means of one of said supply means to closed position and move the discharge control means of the succeeding one of said supply means to open position, said actuating means being energized only during the time of contact of said brush member with said contact to which said actuating means is connected.

10. A gate operating mechanism for use on weighing apparatus having a weigh-hopper, weighing means associated with said weigh-hopper for weighing the contents thereof, and a plurality of supply means adapted to supply material to said weigh-hopper, comprising: discharge control means for each of said supply means movable between supplying and non-supplying positions; operating means for each of said control means for moving same between their two positions; electrically operated actuating means for each of said operating means; an electrical circuit connected to each of said actuating means for energizing same; a contact arm operatively connected to said weighing means, said contact arm being movable upon the increasing of the contents of said weigh-hopper; a brush member mounted on said contact arm;

a dial member adjacent said contact arm; and a series of electrical contacts positioned on said dial member and adapted for consecutive contact by said brush member as said arm is moved, said electrical contacts, said brush member and said circuit being electrically connected so that said actuating means is energized when said brush member contacts the first of said contacts to move said discharge control means of the first of said supply means to open position, and said actuating means associated with two of said discharge control means when said brush member contacts a succeeding one of said contacts to move the discharge control means of one of said supply means to closed position and the discharge control means of the succeeding one of said supply means to open position, there being energized when said brush member contacts the last of said contacts only that actuating means to move said discharge control means of the last of said supply means into closed position.

11. A gate operating mechanism for use with a weighing apparatus having a weigh-hopper, weighing means for weighing the contents of said weigh-hopper, and a plurality of supply bins each having a supply opening for supplying material to said weigh-hopper, comprising: control means associated with each of said supply openings, each having an open and closed position; electrically operated operating means for each of said control means; an opening circuit associated with each of said electrically operated operating means; a closing circuit associated with said electrically operated operating means; and circuit closing means operated by said weighing means, and being operable in accordance with the weight in said weigh-hopper, said circuit closing means first closing the opening circuit of one of said electrically operated operating means to open the control means of one of said supply bins, thereafter closing the closing circuit thereof to close said control means and closing the opening circuit of another electrically operated operating means to open another of said control means, and thereafter closing the closing circuit thereof to close said last-mentioned control means.

12. A gate operating mechanism for use with a weighing apparatus having a weigh-hopper, weighing means for weighing the contents of said weigh-hopper, and a plurality of supply bins each having a supply opening for supplying material to said weigh-hopper, comprising: control means associated with each of said supply openings, each having an open and closed position; electrically operated operating means for each of said control means; an opening circuit associated with each of said electrically operated operating means; a closing circuit associated with said electrically operated operating means, the closing circuit of one of said electrically operated operating means being electrically connected to the opening circuit of another of said electrically operated operating means; and circuit closing means operated by said weighing means, and being operable in accordance with the weight in said weigh-hopper, said circuit closing means first closing the opening circuit of one of said electrically operated operating means to open the control means of one of said supply bins, thereafter simultaneously closing said electrically connected closing and opening circuits in order to close said control means and to open another control means, and thereafter closing the closing circuit thereof to close said last-mentioned control means.

13. A gate operating mechanism for use on weighing apparatus having a weigh-hopper, weighing means associated with said weigh-hopper for weighing the contents thereof, and a plurality of supply means adapted to supply material to said weigh-hopper, comprising: discharge control means for each of said supply means movable between supplying and non-supplying positions; operating means for each of said control means for moving same between their two positions; electrically operated actuating means for each of said operating means; an electrical circuit connected to each of said actuating means for energizing same; a contact arm operatively connected to said weighing means, said contact arm being movable upon the increasing of the contents of said weigh-hopper; a brush member mounted on said contact arm; a dial member adjacent said contact arm; and a series of electrical contacts positioned on said dial member and adapted for consecutive contact by said brush member as said arm is moved, said electrical contacts, said brush member and said circuit being electrically connected so that said actuating means is energized when said brush member contacts the first of said contacts to move said discharge control means of the first of said supply means to open position, and said actuating means is energized when said brush member contacts a succeeding one of said contacts to simultaneously move the discharge control means of one of said supply means to closed position and move the discharge control means of the succeeding one of said supply means to open position, each of said actuating means being energized only for substantially the period of time its associated discharge control means is in motion.

14. A gate operating mechanism for use on weighing apparatus having a weigh-hopper, weighing means associated with said weigh-hopper for weighing the contents thereof, and a plurality of supply means adapted to supply material to said weigh-hopper, comprising: discharge control means for each of said supply means movable between supplying and non-supplying positions; operating means for each of said control means for moving same between their two positions; electrically operated actuating means for each of said operating means; an electrical circuit connected to each of said actuating means for energizing same; a contact arm operatively connected to said weighing means, said contact arm being movable upon the increasing of the contents of said weigh-hopper; a brush member mounted on said contact arm; a dial member adjacent said contact arm; and a series of electrical contacts positioned on said dial member and adapted for consecutive contact by said brush member as said arm is moved, each two adjacent contacts, said brush member and said circuit being electrically connected so that said actuating means is energized when said brush member contacts the first of such two adjacent contacts to move one of said control means to open position, and said actuating means is energized when said brush member contacts the second of said two adjacent contacts to move the same one of said control means to closed position.

15. A gate operating mechanism for use on weighing apparatus having a weigh-hopper, weighing means associated with said weigh-hopper for weighing the contents thereof, and a plurality of supply means adopted to supply material to said weigh-hopper, comprising: discharge control means for each of said supply means movable between supplying and non-supplying positions; operating means for each of said control means for moving same between their two positions; electrically operated actuating means for each of said operating means; an electrical circuit connected to each of said actuating means for energizing same; a contact arm operatively connected to said weighing means, said contact arm being movable upon the increasing of the contents of said weigh-hopper; a brush member mounted on said contact arm; a dial member adjacent said contact arm; and a series of electrical contacts positioned on said dial member and adapted for consecutive contact by said brush member as said arm is moved, said brush member contacting one of said contacts only for substantially the period of time one of said discharge control means is in motion, said electrical contacts, said brush member and said circuit being electrically connected so that said actuating means is energized when said brush member contacts the first of said contacts to move said discharge control means of the first of said supply means to open position, and said actuating means is energized when said brush member contacts a succeeding one of said contacts to simultaneously move the discharge control means of one of said supply means to closed position and move the discharge control means of the succeeding one of said supply means to open position.

16. A gate operating mechanism for use on weighing apparatus having a weigh-hopper, weighing means associated with said weigh-hopper for weighing the contents thereof, and a plurality of supply means adapted to supply material to said weigh-hopper, comprising: discharge control means for each of said supply means movable between supplying and non-supplying positions; operating means for each of said control means for moving same between their two positions; electrically operated actuating means for each of said operating means; an electrical circuit connected to each of said actuating means for energizing same; a contact arm operatively connected to said weighing means, said contact arm being movable upon the increasing of the contents of said weigh-hopper; a brush member mounted on said contact arm; a dial member adjacent said contact arm; and a series of electrical contacts positioned on said dial member and adapted for consecutive contact, as said arm is moved, by said brush member only at the beginning and end of the discharge from each supply means, said electrical contacts, said brush member and said circuit being electrically connected so that said actuating means is energized when said brush member contacts the first of said contacts to move said discharge control means of the first of said supply means to open position, and said actuating means is energized when said brush member contacts a succeeding one of said contacts to simultaneously move the discharge control means of one of said supply means to closed position and move the discharge control means of the succeeding one of said supply means to open position.

MARTIN MADSEN.
ALBERT H. ZIEGLER.
HARRY B. PARROT.
HAROLD M. RUTH.